UNITED STATES PATENT OFFICE.

ARCHIBALD WILSON, OF ST. LOUIS, MISSOURI.

COMPOSITION FOR REMOVING SCALE FROM STEAM-BOILERS.

SPECIFICATION forming part of Letters Patent No. 301,782, dated July 8, 1884.

Application filed April 12, 1884. (No specimens.)

*To all whom it may concern:*

Be it known that I, ARCHIBALD WILSON, of the city of St. Louis, in the State of Missouri, have invented a certain new and useful Composition for the Removal of Scale from Steam-Boilers, of which the following is a full, clear, and exact description.

My composition consists of a decoction of the following materials with tan-bark ooze, and a mixture therewith of carbonate of soda, oil of sassafras, and alcohol. The said materials are as follows and in the proportions named: medium-ground catechu, four pounds eleven ounces, or fifty-five parts; medium-ground logwood, one pound eleven ounces, or twenty parts; medium-ground chestnut-leaves, thirteen and one-half ounces, or ten parts; medium-ground spruce-hemlock leaves, two pounds one and three-quarter ounces, or twenty-five parts; medium-ground gall-nuts, thirteen and one-half ounces, or ten parts; medium-ground sumac-bark, four pounds three and one-half ounces, or fifty parts.

I will now describe more particularly my preferred manner of making the composition. Into a large barrel or hogshead, the upper head being taken out, fix at a distance of four or six inches from the lower head or bottom a false bottom, which should be perforated with as many as feasible one-fourth-inch holes. Over the false bottom lay coarse gunny sack. Through the side of the barrel, between the two bottoms, insert a faucet, for the purpose of withdrawing the liquor. The catechu, logwood, chestnut, spruce-hemlock leaves, gall-nuts, and sumac-bark (ground, say, about as coarse as whole rice) are then tightly packed in the barrel above the false bottom, the materials having previously been thoroughly mixed. Then take tan-bark ooze and pour gradually into the barrel above the ingredients, so as to leach out the properties of the ingredients or materials. Sufficient of the tan-bark ooze is used to make eighty-five pounds, or one thousand parts, of the filtered liquor. To this is added, in moderately fine powder, carbonate of soda, two pounds one and three-quarter ounces, or twenty-five parts. The liquor is then stirred to dissolve and mix the carbonate of soda, after which I add of oil of sassafras one ounce, or six parts, and of alcohol eight ounces, or twenty-five parts, and mix well. The liquid should be kept in close vessels and shaken before use. For a boiler of ordinary size, about one gallon per day may be put into the boiler when the boiler is "dirty."

I claim as my invention—

The described compound of decoction of tan-bark ooze and catechu, logwood, chestnut-leaves, spruce-hemlock leaves, gall-nuts, and sumac-bark, and carbonate of soda, oil of sassafras, and alcohol, for the purpose set forth.

ARCHIBALD WILSON.

In presence of—
GEO. H. KNIGHT,
SAML. KNIGHT.